(12) United States Patent
Tanizawa et al.

(10) Patent No.: US 9,065,684 B2
(45) Date of Patent: Jun. 23, 2015

(54) IP PHONE TERMINAL, SERVER, AUTHENTICATING APPARATUS, COMMUNICATION SYSTEM, COMMUNICATION METHOD, AND RECORDING MEDIUM

(75) Inventors: Yoshimichi Tanizawa, Kanagawa (JP); Naoki Esaka, Kanagawa (JP); Tsutomu Shibata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1044 days.

(21) Appl. No.: 12/365,242

(22) Filed: Feb. 4, 2009

(65) Prior Publication Data

US 2009/0238172 A1 Sep. 24, 2009

(30) Foreign Application Priority Data

Mar. 21, 2008 (JP) ................................. 2008-073411

(51) Int. Cl.
*H04L 12/66* (2006.01)
*H04M 7/00* (2006.01)
*H04M 7/12* (2006.01)

(52) U.S. Cl.
CPC .............. *H04L 12/66* (2013.01); *H04M 7/006* (2013.01); *H04M 7/1205* (2013.01); *H04M 7/0024* (2013.01)

(58) Field of Classification Search
None
See application file for complete search history.

(56) References Cited

U.S. PATENT DOCUMENTS

| 7,269,162 B1* | 9/2007 | Turner ........................... 370/352 |
| 7,532,614 B2* | 5/2009 | Ruyle et al. ..................... 370/352 |
| 7,899,447 B2* | 3/2011 | Takuno et al. ................. 455/418 |
| 2004/0057435 A1* | 3/2004 | Ruyle et al. ................. 370/395.5 |
| 2005/0273607 A1* | 12/2005 | Yamana et al. ............... 713/168 |
| 2006/0143705 A1* | 6/2006 | Sentoff ........................... 726/19 |
| 2006/0262916 A1* | 11/2006 | Marascio et al. ........ 379/201.01 |
| 2007/0223455 A1* | 9/2007 | Chang et al. .................. 370/352 |
| 2008/0056238 A1* | 3/2008 | Inujima et al. ................ 370/352 |

FOREIGN PATENT DOCUMENTS

| JP | 2006-067057 | 3/2006 |
| JP | 2006-352468 | 12/2006 |
| JP | 2007-206851 | 8/2007 |

OTHER PUBLICATIONS

Tanizawa et al.; "Apparatus, Method, and Computer Program Product for Registering User Address Information", U.S. Appl. No. 12/230,575, filed Sep. 2, 2008.
Tanizawa et al.; "Terminal, Method, and Computer Program Product for Registering User Address Information", U.S. Appl. No. 12/202,704, filed Sep. 2, 2008.

* cited by examiner

*Primary Examiner* — Bob Phunkulh
(74) *Attorney, Agent, or Firm* — Finnegan, Henderson, Farabow, Garrett & Dunner, L.L.P.

(57) ABSTRACT

A transfer unit transfers a message between a network and an external terminal. An input unit inputs a user ID for identifying a user. A generating unit generates a registration message requesting a registration of address information of the user. A transmitting unit transmits the registration message to a server. A receiving unit receives a response message including registration information and connection information from the server. When the connection information indicates a permission of a connection of the external terminal to the network, a control unit controls the transfer unit to transfer the message between the network and the external terminal.

9 Claims, 11 Drawing Sheets

FIG.7

| USER NAME | PASSWORD | SIP ADDRESS (AoR) | VID | AUTHENTICATION ALGORITHM |
|---|---|---|---|---|
| "alice" | "pass" | "alice@example.com" | 16 | MD5 |
| "bob" | "bobpass" | "bob@example.com" | 17 | MD5 |
| "bob" | "bobbob" | "Bob-mobile@example.com" | 16 | MD5 |

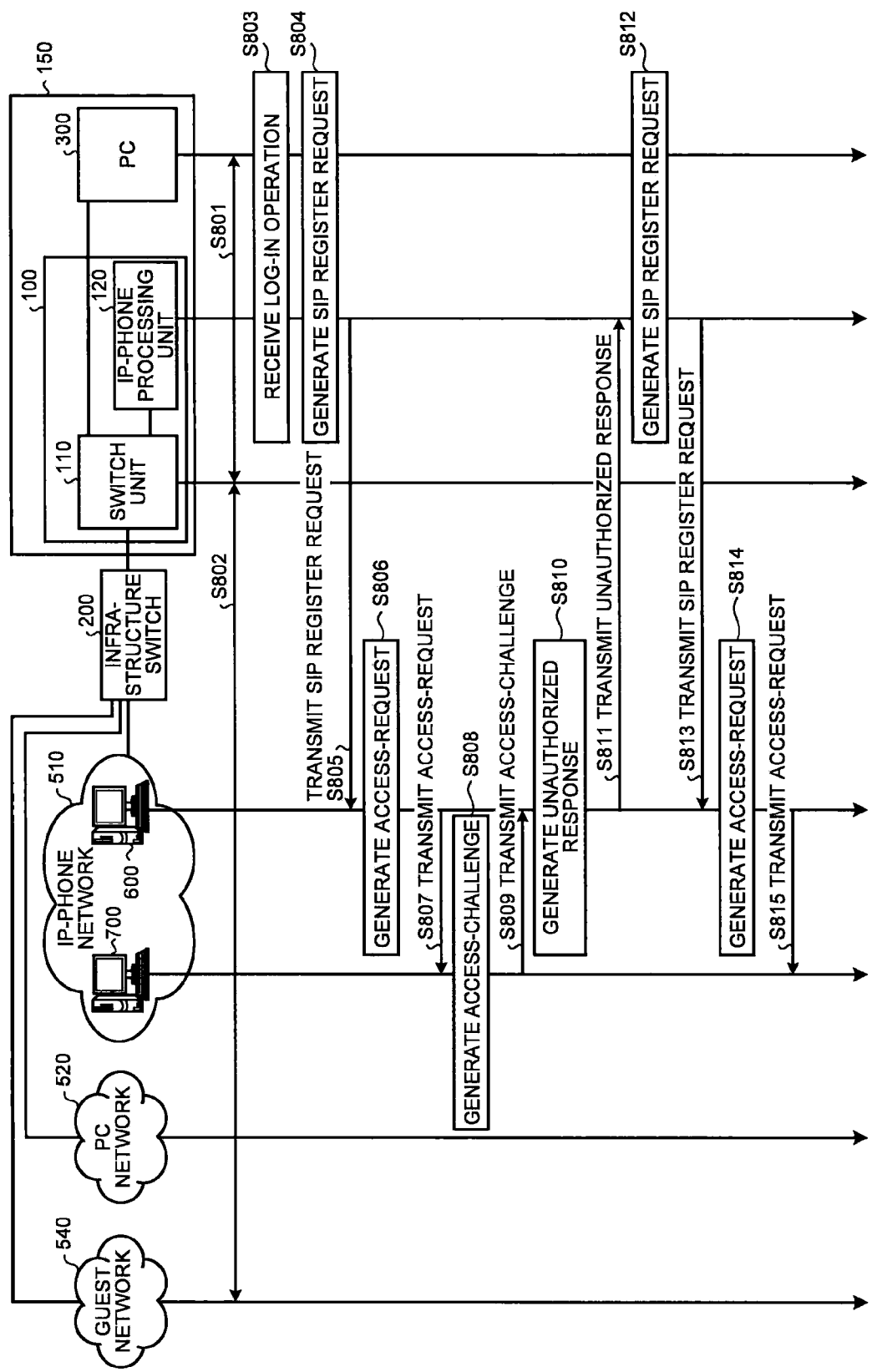

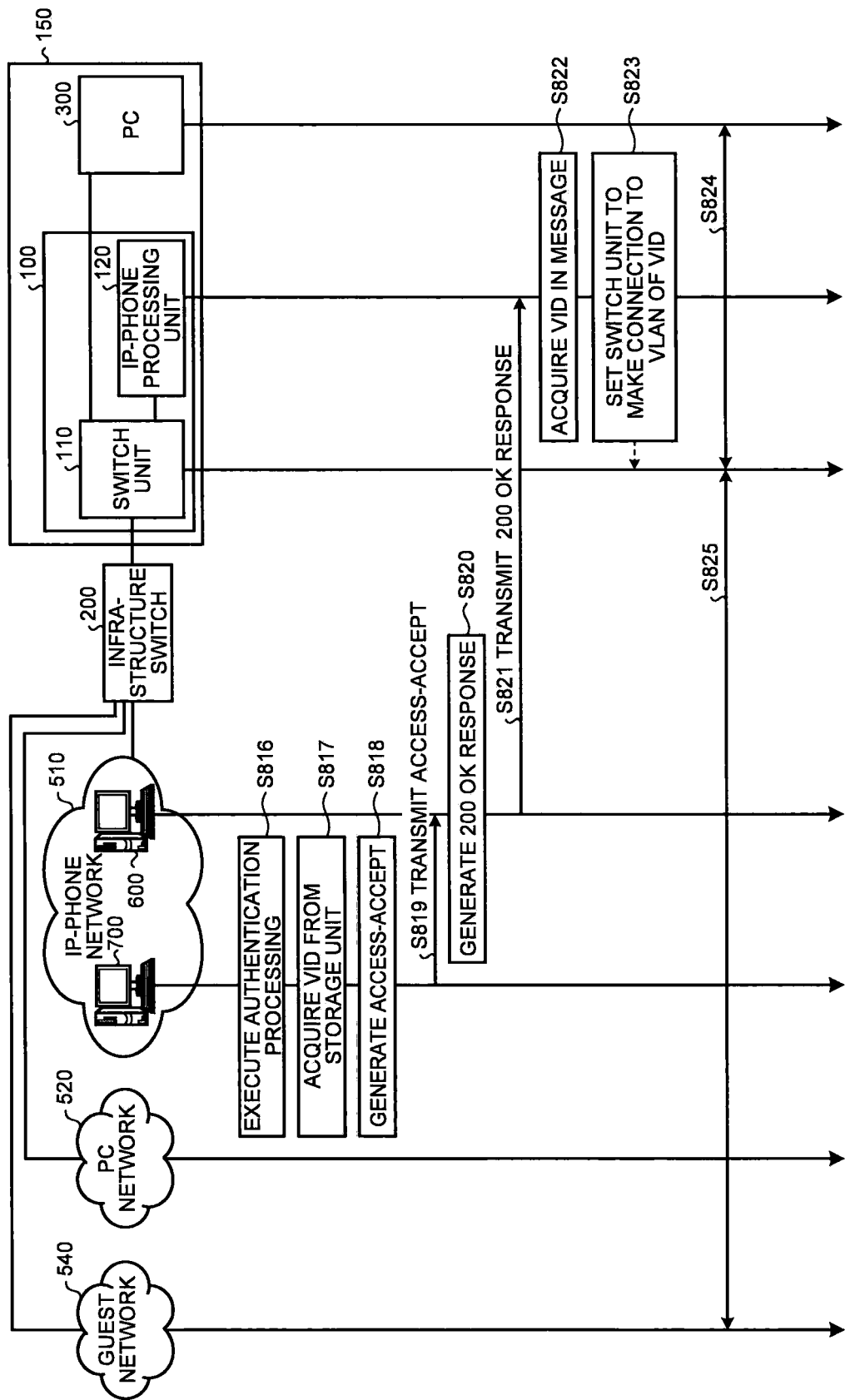

FIG.10

Register sip: registrar.example.com SIP/2.0
Max-Forwards: 70
Via: SIP/2.0/UDP 192.168.0.101; branch=z9hG4bK74aj7
From: <sip: alice@example.com>;tag=xxxxx
To: <sip: alice@example.com>
Call-ID: 2222@192.168.0.101
CSeq: 1 REGISTER
Contact: <sip: alice@192.168.0.101>
Content-Length: 0

FIG.11

Code = 1 (Access-Request)
Attributes:
   NAS-IP-Address = 192.168.0.100
   User-Name = alice
   Digest-Method = REGISTER
   SIP-AOR = sip:alice@example.com
   Message-Authenticator = 01 02 03 04 05

FIG.12

Code = 11 (Access-Challenge)
Attributes:
   Digest-Nonce = abcde
   Digest-Realm = example.com
   Digest-Algorithm = MD5
   Message-Authenticator = 06 07 08 09 10

FIG.13

SIP/2.0 401 Unauthorized
Via: SIP/2.0/UDP 192.168.0.101;
   branch=z9hG4bK74aj7;received=192.168.0.100
From: <sip: alice@example.com>;tag=xxxxx
To: <sip: alice@example.com>;tag=yyyyy
Call-ID: 2222@192.168.0.101
CSeq: 1 REGISTER
Contact: <sip: alice@192.168.0.101>;expires=300
WWW-Authenticate: Digest
   realm="example.com", nonce="abcde", algorithm="MD5"
Content-Length: 0

FIG.14

```
Register sip: registrar.example.com SIP/2.0
Max-Forwards: 70
Via: SIP/2.0/UDP 192.168.0.101; branch=z9hG4bK74aj7
From: <sip: alice@example.com>;tag=zzzzz
To: <sip: alice@example.com>
Call-ID: 2222@192.168.0.101
CSeq: 2 REGISTER
Contact: <sip: alice@192.168.0.101>
Authorization: Digest
   username="alice", realm="example.com", nonce="abcde",
   uri="sip:register.example.com", response="fghij"
Content-Length: 0
```

FIG.15

```
Code = 1 (Access-Request)
Attributes:
   NAS-IP-Address = 192.168.0.100
   User-Name = alice
   Digest-Method = REGISTER
   Digest-Nonce = abcde
   Digest-Realm = example.com
   Digest-Algorithm = MD5
   SIP-AOR = sip:alice@example.com
   Digest-Reponse="fghij"
   Message-Authenticator = 11 12 13 14 15
```

FIG.16

```
Code = 11 (Access-Accept)
Attributes:
   Tunnel-Type: VLAN
   Tunnel-Medium-Type: 802
   Tunnel-Private-Group-ID: 16
   Message-Authenticator = 16 17 18 19 20
```

```
SIP/2.0 200 OK
Via: SIP/2.0/UDP 192.168.0.101;
  branch=z9hG4bK74aj7;received=192.168.0.100
From: <sip: alice@example.com>;tag=zzzzz
To: <sip: alice@example.com>;tag=vvvvv
Call-ID: 2222@192.168.0.101
CSeq: 2 REGISTER
Contact: <sip: alice@192.168.0.101>;expires=300; vid=16;
Content-Length: 0
```

IP PHONE TERMINAL, SERVER, AUTHENTICATING APPARATUS, COMMUNICATION SYSTEM, COMMUNICATION METHOD, AND RECORDING MEDIUM

CROSS-REFERENCE TO RELATED APPLICATIONS

This application is based upon and claims the benefit of priority from the prior Japanese Patent Application No. 2008-73411, filed on Mar. 21, 2008; the entire contents of which are incorporated herein by reference.

BACKGROUND OF THE INVENTION

1. Field of the Invention

The present invention relates to an Internet Protocol (IP) phone terminal that has a relay function between a network and an external terminal such as a personal computer (PC), a server for registering address information of a user of the IP phone terminal, an authentication apparatus that authenticates the user of the IP phone terminal, a communication system incorporating the above apparatuses, a communication method for the above apparatuses, and a computer-readable recording medium that stores therein a computer program for the IP phone terminal.

2. Description of the Related Art

A network-access authentication protocol, such as the IEEE 802.1X, is known as a protocol for permitting a network access only to a terminal authenticated to a certain network system.

In an authentication through the IEEE 802.1X (hereinafter, "802.1X authentication"), an authentication and a connection permission are made at a port level on a connected device. Usually, the 802.1X authentication is performed between an infrastructure switch and a device directly connected to the infrastructure switch.

In a technology disclosed in JP-A 2006-352468 (KOKAI), an authentication by the 802.1X authentication for any one of a plurality of terminals connected to an IEEE 802.1X-compliant port via a switch or the like permits a connection to all the terminals.

In a technology disclosed in JP-A 2006-67057 (KOKAI), when a plurality of terminals is connected to an IEEE 802.1X-compliant port via a switch or the like, the 802.1X authentication and a connection permission are performed on each of the terminals based on a media access control (MAC) address of each of the terminals.

In a technology disclosed in JP-A 2007-206851 (KOKAI), a single sign-on to each terminal is realized by managing in advance information on a correspondence between an IP phone terminal and a thin client terminal.

Recently, an IP phone system has been widely known, which implements a telephone network on an IP network by using a signaling protocol for controlling and relaying a communication between communications devices, such as the session initiation protocol (SIP). An IP phone terminal used in the IP phone system is cabled through the Ethernet (Registered Trademark), and implements a telephone function by performing a call control and a media transfer according to the SIP on the IP network.

When using an IP phone terminal, the user needs to register an SIP address of the user to the IP phone terminal. The registration of SIP address is a processing of associating the SIP address of the user with the SIP address of the IP phone terminal. The user inputs an authentication ID, a password, and the like, to the IP phone terminal in the registration processing. The registration processing is needed for receiving an incoming call addressed to the user correctly, identifying a caller correctly, and setting advanced features, such as a so-called speed dial, of the IP phone terminal for each user. In some cases, for a convenience of the user, the setting is made to allow receiving an incoming call and making an outgoing call by assuming that an SIP address is registered by a default user even without an input of the authentication ID and the password.

Many of IP phone terminals for office use have a built-in switch including an uplink and a downlink one for each to simplify a cabling around a desk. The uplink of the IP phone terminal is connected to a port of an infrastructure switch, and the downlink of the IP phone terminal is connected to a personal computer (PC). With this type of connection, it is possible to use an IP phone terminal and a PC through a single port of the infrastructure switch assigned to the desk.

Generally, this type of connection is configured such that a virtual local area network (VLAN) for accommodating the PC is switched in accordance with an authentication result of the 802.1X authentication. In this case, for example, the PC is an 802.1X supplicant, the built-in switch of the IP phone terminal is an 802.1X authenticator, and an authentication server connected to the infrastructure network is an 802.1X authentication server. The 802.1X authentication to the PC is executed among the authentication server, the IP phone terminal, and the PC. When the PC is authenticated by the authentication server, the IP phone terminal determines a VLAN for connecting the PC by referring to information on the VLAN notified by the authentication server, and changes a VLAN setting of a corresponding port.

However, under an environment in which the PC is connected to the infrastructure network via the IP phone terminal as described above, it is necessary to perform the registration processing of the SIP address on the IP phone terminal and the authentication processing on the PC, which causes a cumbersome operation for using the PC.

In other words, to start using the IP phone terminal and the PC at the desk on which the IP phone terminal is installed, the user needs to perform a connection of the PC to the downlink of the IP phone terminal, an operation of the IP phone terminal to register the SIP address of the user to the IP phone terminal, and an operation for the 802.1X authentication to the infrastructure network from the connected PC and receiving a connection permission and a VLAN allocation.

SUMMARY OF THE INVENTION

According to one aspect of the present invention, there is provided an Internet-protocol phone terminal that mediates a connection between an external terminal and a network, and provides an Internet-protocol phone function by registering address information, which is information for identifying a user, for specifying the user as a communication destination to a server that is connected to the Internet-protocol phone terminal via the network. The Internet-protocol phone terminal includes a transfer unit that transfers a message between the network and the external terminal; an input unit that inputs a user identification, which is information for identifying the user, to be used for an authentication of the user; a generating unit that generates a registration message requesting a registration of the address information of the user identified by the user identification input by the input unit; a transmitting unit that transmits the registration message to the server; a receiving unit that receives a response message including registration information indicating availability of the registration of the address information and connection information indicating availability of a connection of the external terminal to the network from the server; and a control unit that controls, when the connection information indicates a permission of the connection of the external terminal to the network, the transfer unit to transfer the message between the network and the external terminal.

Furthermore, according to another aspect of the present invention, there is provided a server that is connected to an Internet-protocol phone terminal, which mediates a connection between an external terminal and a network, via the network, to which address information that is information for identifying a user and for specifying the user as a communication destination is registered. The server includes a receiving unit that receives a registration message requesting a registration of the address information from the Internet-protocol phone terminal; an authentication processing unit that performs an authentication of the address information; a creating unit that creates a response message including registration information indicating availability of a registration of the address information and connection information indicating availability of a connection of the external terminal to the network; and a transmitting unit that transmits the response message to the Internet-protocol phone terminal.

Moreover, according to still another aspect of the present invention, there is provided an authentication apparatus that is connected to an Internet-protocol phone terminal, which mediates a connection between an external terminal and a network, and a server to which address information that is information for identifying a user and for specifying the user as a communication destination is registered, via the network. The authentication apparatus includes a receiving unit that receives a request message requesting an authentication of a user identification for identifying a user of the address information from the server; an authentication processing unit that authenticates the user identification for which the authentication is requested in the request message; and a transmitting unit that transmits a response message to the server, the response message including a result of the authentication by the authentication processing unit and connection information indicating availability of a connection of the external terminal to the network.

Furthermore, according to still another aspect of the present invention, there is provided a communication system including an Internet-protocol phone terminal that mediates a connection between an external terminal and a network; and a server that is connected to the Internet-protocol phone terminal via the network, to which address information, which is information for identifying a user, for specifying the user as a communication destination is registered, wherein the Internet-protocol phone terminal includes a transfer unit that transfers a message between the network and the external terminal, an input unit that inputs a user identification, which is information for identifying the user, to be used for an authentication of the user, a generating unit that generates a registration message requesting a registration of the address information of the user identified by the user identification input by the input unit, a transmitting unit that transmits the registration message to the server, a receiving unit that receives a response message including registration information indicating availability of the registration of the address information and connection information indicating availability of a connection of the external terminal to the network from the server, and a control unit that controls, when the connection information indicates a permission of the connection of the external terminal to the network, the transfer unit to transfer the message between the network and the external terminal, and the server includes a receiving unit that receives the registration message from the Internet-protocol phone terminal, an authentication processing unit that performs an authentication of the address information, a generating unit that generates the response message including the registration information and the connection information, and a transmitting unit that transmits the response message to the Internet-protocol phone terminal.

Moreover, according to still another aspect of the present invention, there is provided a communication method for a communication system including an Internet-protocol phone terminal that mediates a connection between an external terminal and a network and a server that is connected to the Internet-protocol phone terminal via the network, to which address information, which is information for identifying a user, for specifying the user as a communication destination is registered. The communication method includes first generating including the Internet-protocol phone terminal generating a registration message requesting a registration of the address information of a user identified by a user identification; first transmitting including the Internet-protocol phone terminal transmitting the registration message to the server; first receiving including the server receiving the registration message from the Internet-protocol phone terminal; authenticating including the server authenticating the address information; second generating including the server generating a response message including registration information indicating availability of the registration of the address information and connection information indicating availability of a connection of the external terminal to the network from the server; second transmitting including the server transmitting the response message to the Internet-protocol phone terminal; second receiving including the Internet-protocol phone terminal receiving the response message from the sever; and controlling including the Internet-protocol phone terminal controlling a transfer of a message between the network and the external terminal a connection status of the external terminal to the network indicated by the connection information.

Furthermore, according to still another aspect of the present invention, there is provided a computer-readable recording medium that stores therein a computer program for controlling a transfer of a message in a computer. The computer mediates a connection between an external terminal and a network, and provides an Internet-protocol phone function by registering address information, which is information for identifying a user, for specifying the user as a communication destination to a server that is connected to the Internet-protocol phone terminal via the network. The computer program when executed causes the computer to execute generating a registration message requesting a registration of the address information of a user identified by a user identification; transmitting the registration message to the server; receiving a response message including registration information indicating availability of the registration of the address information and connection information indicating availability of a connection of the external terminal to the network from the server; and controlling the transfer of the message between the network and the external terminal a connection status of the external terminal to the network indicated by the connection information.

BRIEF DESCRIPTION OF THE DRAWINGS

FIG. 7 is a schematic diagram of an example of data structure of authentication information store in a storage unit of the authentication server;

FIG. 8 is a sequence diagram that depicts a general flow of a login authentication processing according to the embodiment;

FIG. 9 is a sequence diagram that depicts a general flow of a login authentication processing according to the embodiment;

FIG. 10 is an example of an SIP Register Request message;

FIG. 11 is an example of an Access-Request message of a Remote Authentication Dial In User Service (RADIUS);

FIG. 12 is an example of an Access-Challenge message;

FIG. 13 is an example of a 401 Unauthorized Response message;

FIG. 14 is an example of an SIP Register Request message;

FIG. 15 is an example of an Access-Request message;

FIG. 16 is an example of an Access-Accept message;

DETAILED DESCRIPTION OF THE INVENTION

Exemplary embodiments of the present invention will be explained in detail below with reference to the accompanying drawings.

An IP phone terminal according to an embodiment of the present invention registers thereon an SIP address of a user when login authentication of the IP phone terminal is successfully performed, and sets a VLAN to which the IP phone terminal intermediately connects a PC as an external terminal. Accordingly, network access authentication does not need to be separately executed by the PC.

Figure 1:
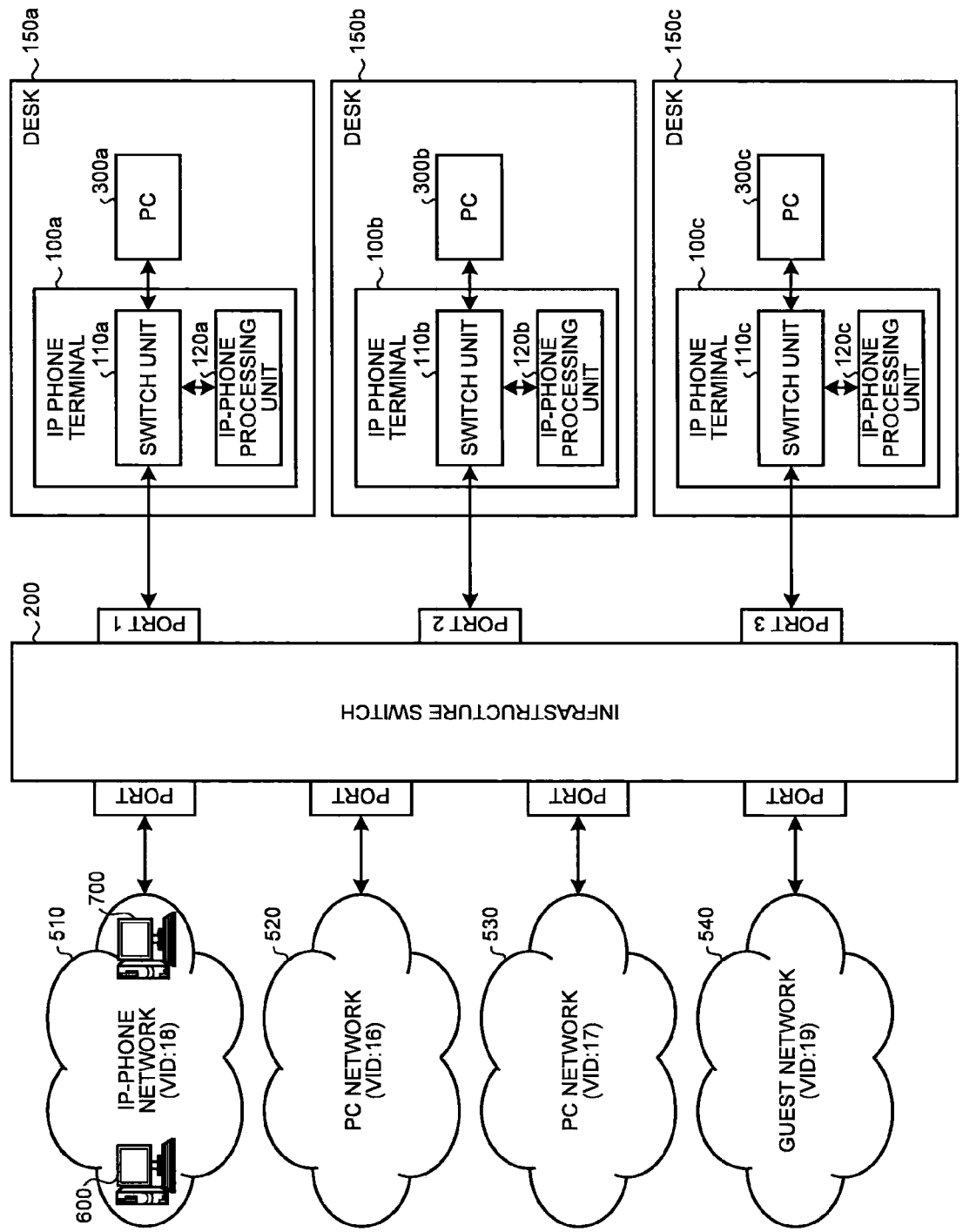
FIG. 1 is a schematic diagram of a network configuration of a communication system according to an embodiment of the present invention.

As shown in FIG. 1, an IP phone system according to the embodiment includes IP phone terminals 100a to 100c and PCs 300a to 300c that are placed on desks 150a to 150c each indicating a desk space, an infrastructure switch 200, a proxy server 600, and an authentication server 700.

According to the connection configuration in the figure, the IP phone terminals 100a to 100c are provided on the desks 150a to 150c, respectively. Additionally, the PCs 300a to 300c, which are, for example, a portable PC distributed to respective users, are provided on the desks 150a to 150c, respectively. The IP phone terminals 100a to 100c have a similar configuration, therefore, hereinafter they are sometimes simply referred to as an IP phone terminal 100. Similarly, the PCs 300a to 300c are sometimes simply referred to as the PC 300. Although the number of IP phone terminals 100 and the number of the PCs in the present example are three, they are not limited to a specific number.

The infrastructure switch 200 is a switching device that is operated as part of a network infrastructure in an office, and corresponds to an edge device for connecting the PC 300 and the IP phone terminal 100 to networks. The infrastructure switch 200 assigns one physical port to each of the desks 150, and provides a cable of Ethernet (registered trademark). Moreover, the infrastructure switch 200 can deal with a plurality of VLANs.

According to the embodiment, it is assumed that the following VLANs are set.

(1) IP-phone network VLAN: A VLAN configured to accommodate devices that implement IP phone functions, for example, the IP phone terminal 100, the proxy server 600, the authentication server 700 that authenticates a user, and the like. The VLAN corresponds to an IP-phone network 510 in the figure. It is assumed that a VLAN identification (ID) with which the VLAN is identified (hereinafter, "VID") is 18.

(2) PC network VLAN: A VLAN configured to accommodate the PC 300 connected by a user. VLANs accommodating the PC 300s of users vary among sections or departments of the users. To connect to the VLAN, authentication of the user is required. The VLAN corresponds to PC networks 520 and 530 in the figure. It is assumed that the VIDs of the PC networks 520 and 530 are 16 and 17, respectively.

(3) Guest network VLAN: A VLAN configured to accommodate the PC 300 connected by a user. When connecting to the VLAN, authentication of the user is not required. In other words, the VLAN accommodates the PC 300 in an unauthenticated state before authentication is executed. The VLAN corresponds to a guest network 540 in the figure. It is assumed that the VID of the VLAN is 19.

Each of the VLANs is a usual IP network that includes a router and a switch (not shown). It is configured such that the VLANs cannot access one another due to firewalls (not shown).

The IP phone terminal 100 includes an IP-phone processing unit 120 that provides IP phone functions to a user who uses a desk space, and a switch unit 110 as a transfer unit that provides a switching function.

First of all, the IP phone functions are explained below. The IP phone terminal 100 uses the SIP for call control of the IP phone functions. The IP phone terminal 100 includes a dialing unit and a headset (a speaker and a microphone) for using ordinary telephone functions. Specifically, a user can use functions similar to an ordinary telephone, for example, a call function of making an outgoing call by dialing the address of a destination of a call by using the dialing unit, and a function of receiving an incoming call addressed to the IP phone terminal 100 and talking by using the headset.

To use the following functions, a desk space user needs to register the SIP address of the user by using the dialing unit of the IP phone terminal 100.

(1) Originating an outgoing call indicating the address of the desk space user as an originator (2) Receiving an incoming call addressed to the desk space user (3) Extended functions of the IP phone (abbreviated dialing, setting of voice mail, setting of transfer per user, setting of call rejection per user, and the like) used by the desk space user Then, the switching function is explained below. As described above, the switch unit 110 that provides the switching function is built in the IP phone terminal 100. The switch unit 110 accommodates an IP-phone processing unit 120a to the IP-phone network VLAN (the IP-phone network 510).

The IP phone terminal 100 includes an uplink and a downlink one each as connection interfaces (I/Fs) for connecting Ethernet (registered trademark). The uplink is connected to a port of the infrastructure switch 200, and a VLAN trunk connection is established between the infrastructure switch 200 and the IP phone terminal 100. On the other hand, the downlink is used for connecting the PC 300. The IP phone terminal 100 accommodates the PC 300 to a VLAN to which an access is permitted as a result of a login operation performed by the IP phone terminal 100.

The PC 300 is a terminal that the user brings into the desk space and uses by connecting to the downlink of the IP phone terminal 100. The user can use network functions by connecting the PC 300 to the downlink of the IP phone terminal 100. According to the embodiment, it is assumed that the IP phone terminal 100 and the PC 300 placed in the same desk space are used by the same user.

The proxy server 600 is a server for providing a call processing service to the IP phone terminal 100 according to the SIP. For example, the proxy server 600 performs routing of SIP message, registration of SIP address, and authentication of user arising from registration of SIP address. According to the embodiment, the proxy server 600 further includes a function of providing a VLAN to the user upon authenticating the user when registering SIP address.

The authentication server 700 is an authentication device that stores therein information about users, and authenticates a user. According to the embodiment, the authentication server 700 is used for user authentication when registering an SIP address in response to a request from the proxy server 600. Moreover, the authentication server 700 has a function of determining availability of a network service to the user, or an available network (VLAN).

Figure 2:
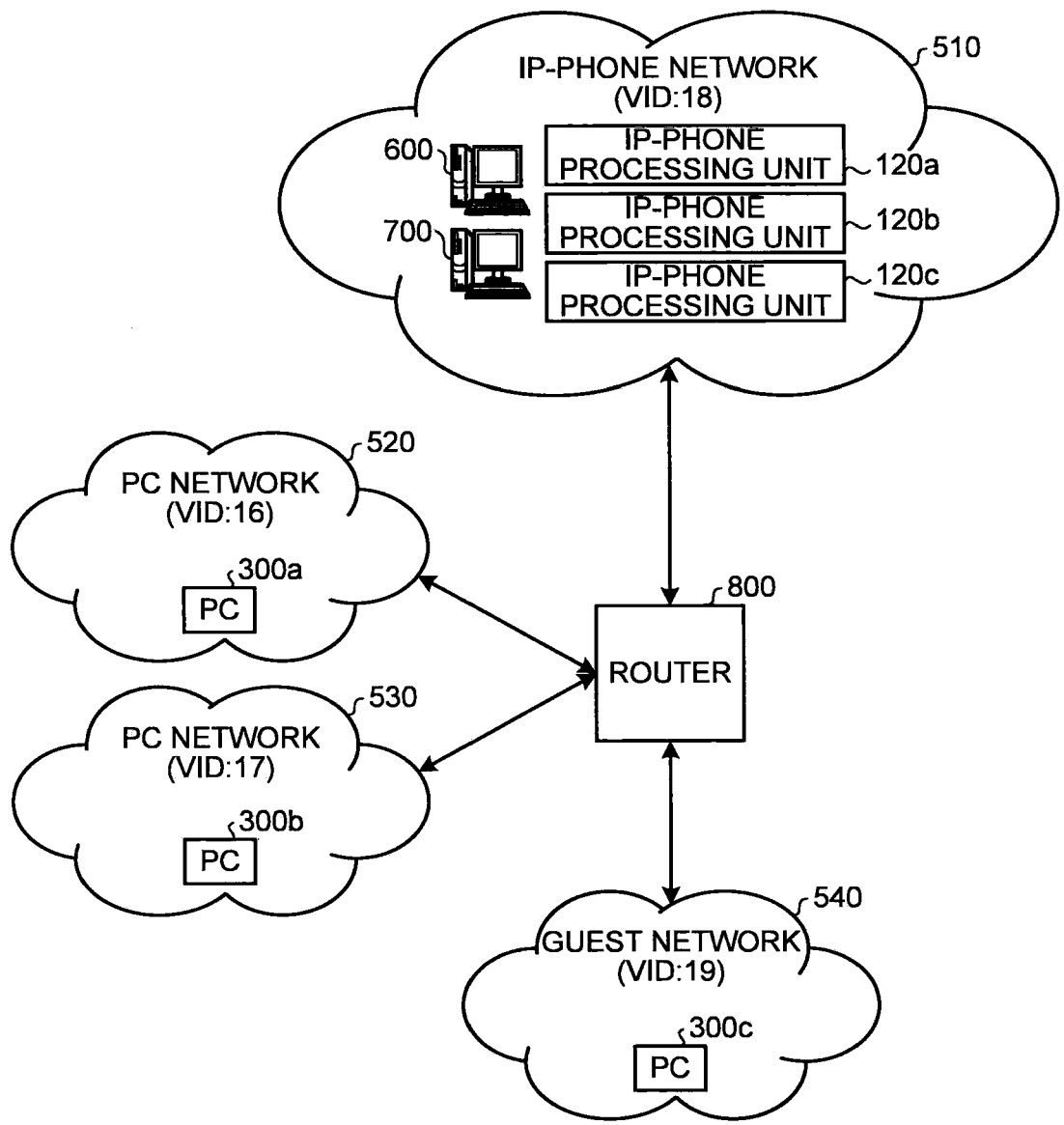
FIG. 2 is a schematic diagram of an example of a network configuration of a layer 3 according to the embodiment.
Figure 3:
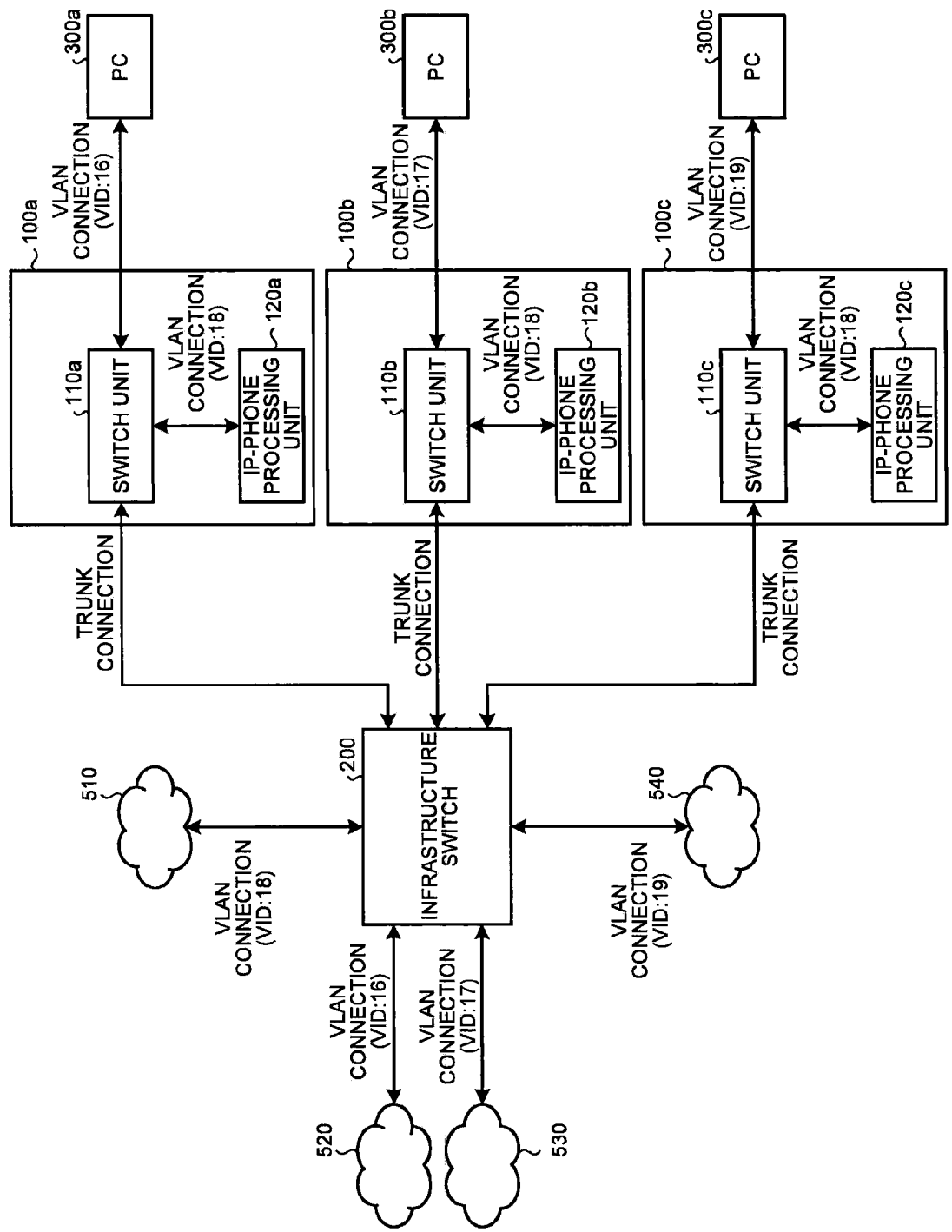
FIG. 3 is a schematic diagram of an example of a network configuration of a layer 2 according to the embodiment.

Then, network configurations in a layer 3 (network layer) and the layer 2 (data link layer) of the IP phone system according to the embodiment are explained below. FIG. 2 is a schematic diagram of an example of a network configuration of the layer 3 corresponding to the network schematic diagram shown in FIG. 1. FIG. 3 is a schematic diagram of an example of a network configuration of the layer 2 corresponding to the network schematic diagram shown in FIG. 1.

As shown in FIG. 2, the VLANs (namely, the IP-phone network 510, the PC networks 520 and 530, and the guest network 540) are connected to each other via a router 800. As shown in the figure, the IP-phone network 510 includes the proxy server 600, the authentication server 700, and IP-phone processing units 120a to 120c of the IP phone terminal 100. The figure depicts an example in which the PC 300a is accommodated to the PC network 520, and the PC 300b is accommodated to the PC network 530. Moreover, the figure depicts an example in which the PC 300c is accommodated to the guest network 540 because the PC 300c is unauthenticated.

FIG. 3 corresponds to a schematic diagram of a network configuration in the layer 2 when the PC 300s are accommodated to the respective VLANs shown in FIG. 2. As shown in FIG. 3, the infrastructure switch 200 is connected to the IP-phone network 510, the PC network 520, the PC network 530, and the guest network 540 through VLAN connections of the VIDs 18, 16, 17, and 19, respectively. Moreover, the infrastructure switch 200 is connected to each of the IP phone terminals 100a to 100c through a trunk connection.

A switch unit 110a of the IP phone terminal 100a is connected in between the IP-phone processing unit 120a and the PC 300a through VLAN connections of the VIDs 18 and 16, respectively. Similarly, a switch unit 110b of the IP phone terminal 100b is connected in between the IP-phone processing unit 120b and the PC 300b through VLAN connections of the VIDs 18 and 17, respectively. Moreover, a switch unit 110c unit 120.

As a detailed configuration, the IP-phone processing unit 120 includes the IP-phone I/F unit 121, a Transmission Control Protocol/Internet Protocol (TCP/IP) PROTOCOL STACK unit 122, a message processing unit 123, a media processing unit 124, an application unit 125, a user I/F unit 126, and the control unit 127.

The IP-phone I/F unit 121 is an internal network I/F of the IP phone terminal 100. The IP-phone I/F unit 121 transfers a frame addressed to each of the VLANs and the PC 300 to the switch unit 110, and receives a frame addressed to the IP phone terminal 100 from the switch unit 110. Moreover, the IP-phone I/F unit 121 transfers a frame addressed to the IP phone terminal 100 to the TCP/IP PROTOCOL STACK unit 122.

The TCP/IP PROTOCOL STACK unit 122 performs processing according to the TCP/IP for implementing the IP phone functions. Specifically, the TCP/IP PROTOCOL STACK unit 122 executes TCP/IP protocol processing required for the message processing unit 123 and the media processing unit 124 to transmit and to receive an SIP message and media, respectively.

The message processing unit 123 executes call control for implementing the IP phone functions in accordance with specifications of an SIP User Agent (UA) according to the protocol standards of the SIP. For example, the message processing unit 123 generates an SIP message in accordance with an instruction given by the application unit 125, and transmits the generated SIP message via the TCP/IP PROTOCOL STACK unit 122. Moreover, the message processing unit 123 identifies an SIP message received from the TCP/IP PROTOCOL STACK unit 122, and notifies the application unit 125 of required call control information.

As a more detailed configuration, the message processing unit 123 includes a generating unit 123a and a transmitting-receiving unit 123b.

The generating unit 123a generates various SIP messages of the IP phone terminal 100c is connected in between the IP-phone processing unit 120c and the PC 300c through VLAN connections of the VIDs 18 and 19, respectively.

Figure 4:
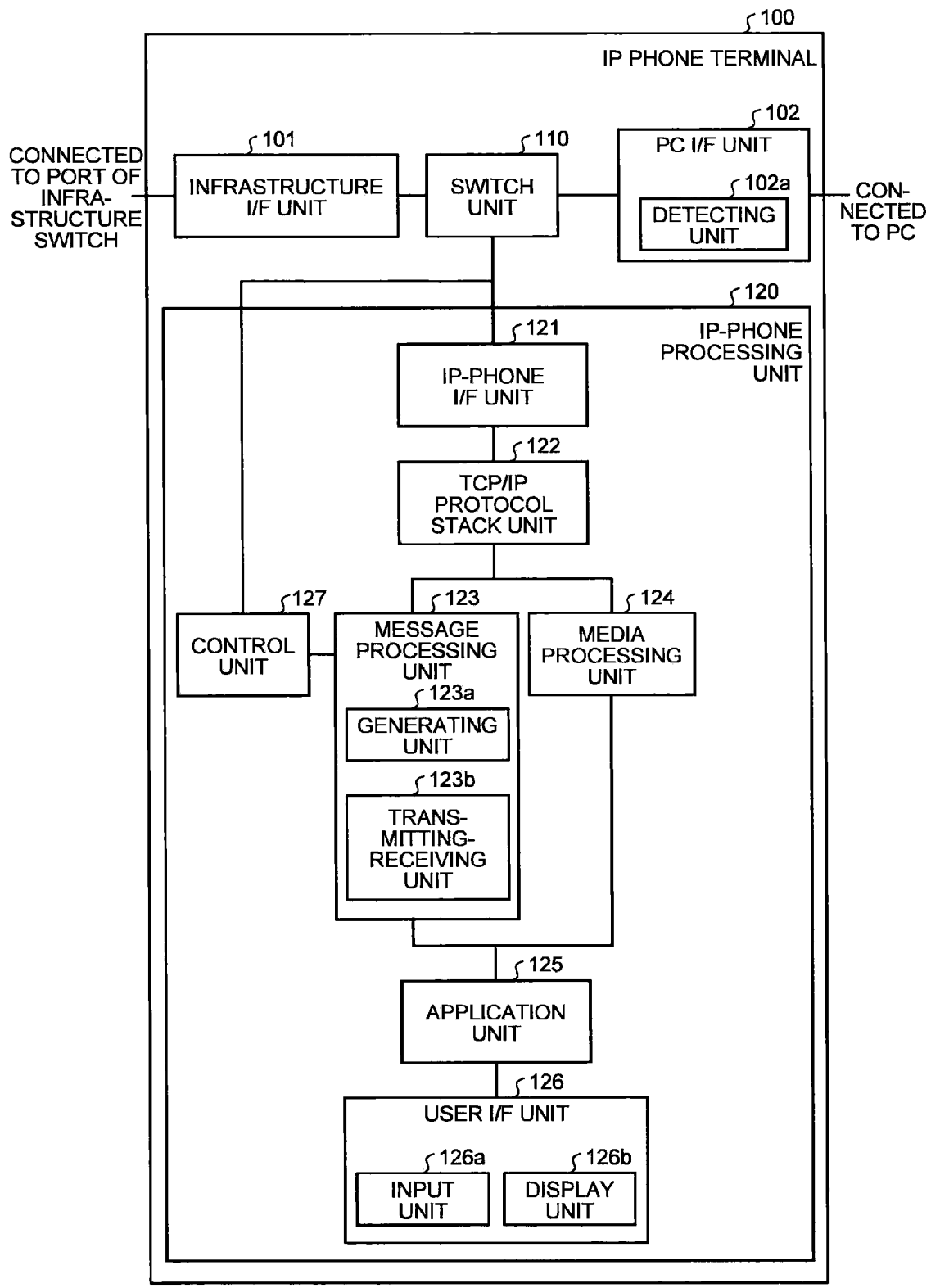
FIG. 4 is a functional block diagram of a detailed configuration of an Internet protocol (IP) phone terminal according to the embodiment.

Details of functions and a configuration of the IP phone terminal 100 are explained below. As shown in FIG. 4, the IP phone terminal 100 includes an infrastructure I/F unit 101, a PC I/F unit 102, the switch unit 110, and the IP-phone processing unit 120.

The infrastructure I/F unit 101 terminates a cable connection of Ethernet (registered trademark) to the infrastructure switch 200, and provides a network I/F function. Specifically, the infrastructure I/F unit 101 sends outside a frame addressed to each of the VLANs, receives a frame addressed to the IP phone terminal 100 and the PC 300, and transfers it to the switch unit 110.

The PC I/F unit 102 terminates a cable connection of Ethernet (registered trademark) to the PC 300, and provides a network I/F function. Specifically, the PC I/F unit 102 sends outside a frame addressed to the PC 300, receives a frame addressed to each of the VLANs and the IP phone terminal 100, and transfers it to the switch unit 110. Moreover, the PC I/F unit 102 includes a detecting unit 102a. The detecting unit 102a detects that a connection to the PC 300 is established, and that the connection to the PC 300 is disconnected.

The switch unit 110 is an Ethernet (registered trademark) switch that transfers an Ethernet (registered trademark) frame in accordance with its destination. Moreover, the switch unit 110 manages each of the VLANs. In other words, the switch unit 110 assigns a VLAN ID to each of I/F units, namely, the infrastructure I/F unit 101, the PC I/F unit 102, and an IP-phone I/F unit 121 (described later) in the IP-phone processing unit 120, and can set such that only a traffic of a specific VLAN is transferred to each of the I/F units. Such setting of the VLANs is executed by a control unit 127 (described later)

in the IP-phone processing to be used for call control. For example, the generating unit 123a generates an SIP Register Request message that is a registration message for registering the SIP address of a user of the IP phone terminal 100 to the proxy server 600.

The transmitting-receiving unit 123b transmits and receives various messages via the TCP/IP PROTOCOL STACK unit 122. For example, the transmitting-receiving unit 123b transmits an SIP Register Request message generated by the generating unit 123a to the proxy server 600. Moreover, the transmitting-receiving unit 123b receives a 200 OK Response message that is a response message transmitted from the proxy server 600 as a response to an SIP Register Request message.

According to the embodiment, the proxy server 600 transmits to the IP phone terminal 100 a 200 OK Response message that includes a VID of a VLAN that is to accommodate the PC 300 of a user whose registration of SIP address is permitted (details will be described later). The message processing unit 123 then extracts the VID from the message, and request the control unit 127 (described later) to change VLAN setting of the PC I/F unit 102 to the extracted VID.

The media processing unit 124 performs media processing in which media information, such as audio or image information, is processed for implementing the IP phone functions. Specifically, the media processing unit 124 transmits a media packet (Real-time Transport Protocol/Real-time Transport Control Protocol (RTP/RTCP)) via the TCP/IP PROTOCOL STACK unit 122 in accordance with an instruction given by the application unit 125. Moreover, the media processing unit 124 identifies a media packet received from the TCP/IP PROTOCOL STACK unit 122, and notifies the application unit 125 of media information.

The application unit 125 is application software for implementing the IP phone functions by performing call control and media processing. The application unit 125 uses the message processing unit 123 and the media processing unit 124 for call control and media processing, respectively. The application unit 125 is operated by a user via the user I/F unit 126.

The user I/F unit 126 provides a user I/F for user to use the IP phone functions. The user I/F unit 126 includes an input unit 126a that receives input of data, such as a user name and a password to be used for authentication, and a display unit 126b that displays a prompt and a display screen for data input. The input unit 126a can be configured with a dial, an operation button, or a keyboard. The display unit 126b can be configured with a Liquid Crystal Display (LCD). In addition, the user I/F unit 126 can be configured to include, for example, a headset (a speaker and a microphone), a ringing speaker, a Light Emitting Diode (LED), and the like.

The user I/F unit 126 generates SIP application control information required for using the IP phone functions based on operation information by the user, and controls the application unit 125. For example, the user I/F unit 126 generates SIP application control information required for outgoing processing from operation information that is a dialed number, and controls the application unit 125.

The control unit 127 performs VLAN setting of the switch unit 110. The control unit 127 can specify respective VLANs to which three I/F units belong by setting the switch unit 110. For example, by separately setting a VLAN to which the IP-phone I/F unit 121 belongs and a VLAN to which the PC I/F unit 102 belongs, the control unit 127 can set such that the switch unit 110 relays the VLANs via the infrastructure I/F unit 101.

Usually, setting of VLANs are set prior to the start of the system operation by a maintenance technician of the IP phone terminal 100 or the system via a maintenance I/F, for example. For example, the VID 18 is set for the IP-phone I/F unit 121, and the VID 19 of the guest network 540 is set for the PC I/F unit 102 as a VID of a default VLAN.

According to the embodiment, the control unit 127 controls the switch unit 110 so as to change VLAN setting of the PC I/F unit 102 dynamically to a VID included in the 200 OK Response message in accordance with a request from the message processing unit 123. Accordingly, setting of the VLAN that is to accommodate the PC 300 can be completed simultaneously with SIP address registration processing.

Figure 5:
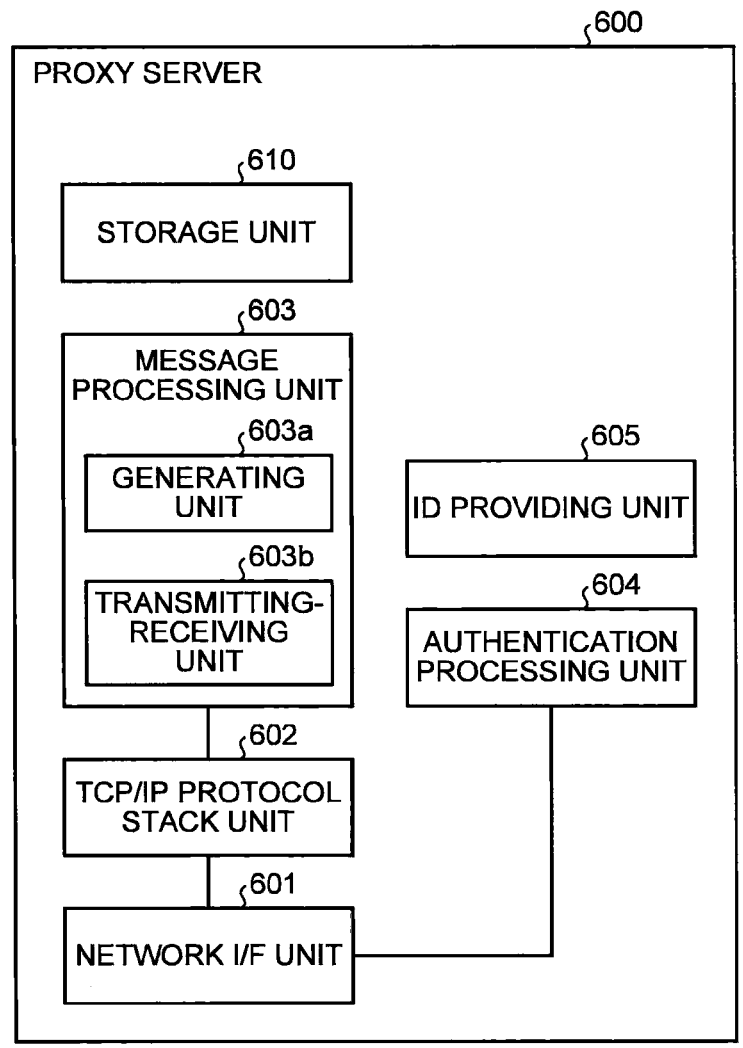
FIG. 5 is a functional block diagram of a detailed configuration of a proxy server according to the embodiment.

Details of functions and a configuration of the proxy server 600 are explained below. As shown in FIG. 5, the proxy server 600 includes a storage unit 610, a network I/F unit 601, a TCP/IP PROTOCOL STACK unit 602, a message processing unit 603, an authentication processing unit 604, and an ID providing unit 605.

The storage unit 610 stores therein various data required for implementing the IP phone functions. For example, the storage unit 610 stores therein an SIP location database (DB) that holds associations of SIP addresses. Specifically, the SIP location DB holds an Address of Record (AoR) that is an SIP address specified with an SIP message as a destination of a call, and a contact address that is an SIP address to be an original destination of the call in an associated manner. The SIP location DB is referred and renewed by the message processing unit 603. For example, the message processing unit 603 registers an AoR and a contact address of an authenticated user into the SIP location DB in an associated manner.

It can be configured such that another external server stores therein a database, such as the SIP location DB stored in the storage unit 610, and the database is to be referred and renewed by the proxy server 600. The storage unit 610 can be configured with any storage medium that is generally used, such as a Hard Disk Drive (HDD), an optical disk, a memory card, or a Random Access Memory (RAM).

The network I/F unit 601 is an I/F that connects the proxy server 600 to a network (the IP-phone network 510). The network I/F unit 601 sends a frame received from the TCP/IP PROTOCOL STACK unit 602 to the network, and transfers a frame received from the network to the TCP/IP PROTOCOL STACK unit 602.

The TCP/IP PROTOCOL STACK unit 602 performs processing according to the TCP/IP protocol for implementing the IP phone functions. Specifically, the TCP/IP PROTOCOL STACK unit 602 executes TCP/IP protocol processing required for the message processing unit 603 to transmit and to receive an SIP message.

The message processing unit 603 executes call control for implementing the IP phone functions in accordance with specifications of an SIP proxy according to the protocol standards of the SIP. Specifically, the message processing unit 603 interprets an SIP message received from the TCP/IP PROTOCOL STACK unit 602, adds a needed modification to the SIP message, and then transmits the SIP message to the TCP/IP PROTOCOL STACK unit 602. When transmitting, the message processing unit 603 refers to associations of SIP addresses stored in the SIP location DB in the storage unit 610. Moreover, the message processing unit 603 requests authentication for SIP address registration to the authentication processing unit 604.

As a more detailed configuration, the message processing unit 603 includes a generating unit 603a, and a transmitting-receiving unit 603b.

The generating unit 603a generates various SIP messages to be used for call control. For example, the generating unit 603a generates a 200 OK Response message that includes a VID notified together with an authentication result by the authentication server 700, as a response message to an SIP Register Request message transmitted by the IP phone terminal 100.

The transmitting-receiving unit 603b transmits and receives various messages via the TCP/IP PROTOCOL STACK unit 602. For example, the transmitting-receiving unit 603b receives an SIP Register Request message for registering an SIP address from the IP phone terminal 100. Moreover, the transmitting-receiving unit 603b transmits a 200 OK Response message generated by the generating unit 603a to the IP phone terminal 100.

The authentication processing unit 604 executes authentication processing for authenticating a user who made a request for registration of SIP address. The authentication processing unit 604 is used by the message processing unit 603 that received the request for registration of the SIP address to determine acceptability of registration. In other words, the message processing unit 603 determines whether a certain user can use the SIP address by executing digest authentication by using the authentication processing unit 604.

The authentication processing unit 604 according to the embodiment authenticates a user by using the authentication server 700 that makes access according to an AAA protocol, such as the Remote Authentication Dial In User Service (RADIUS). It can be configured such that the proxy server 600 stores therein data required for authentication, and completes the authentication within the proxy server 600 without using the authentication server 700.

When the authentication processing unit 604 permits the use of an SIP address to a user, the ID providing unit 605 specifies the VID of a VLAN to which the user belongs, and notifies the message processing unit 603 of the specified VID in order to be included in an SIP message. Specifically, the ID providing unit 605 extracts a VID corresponding to the authenticated user from a message of a notice of an authentication result notified by the authentication server 700, and specifies the extracted VID as the VID of the VLAN to which the user belongs.

It can be configured such that the proxy server 600 stores therein VIDs of VLANs to be allocated user by user, and completes provision of a VID within the proxy server 600. Moreover, it can be configured such that the ID providing unit 605 has access to the authentication server 700 or an external server different from the authentication server 700, such as a Lightweight Directory Access Protocol (LDAP) server, according to another protocol different from the AAA protocol, and acquires a VID corresponding to the user.

Figure 6:
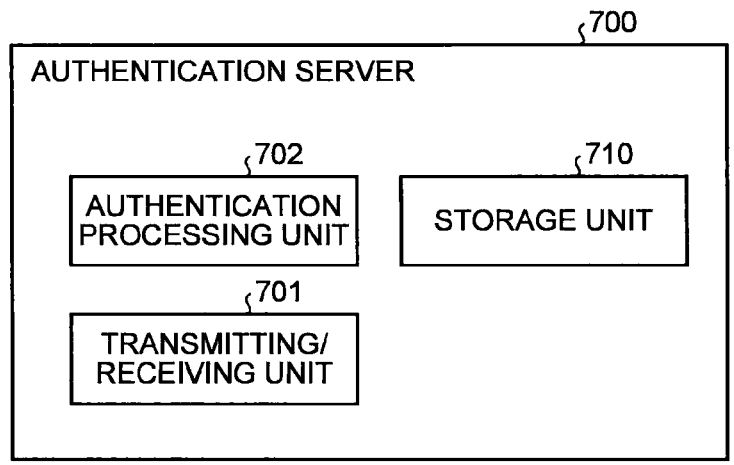
FIG. 6 is a functional block diagram of a detailed configuration of an authentication server according to the embodiment.

Details of functions and a configuration of the authentication server 700 are explained below. As shown in FIG. 6, the authentication server 700 includes a storage unit 710, a transmitting-receiving unit 701, and an authentication processing unit 702.

The storage unit 710 stores therein authentication information to be used for authentication of users. As shown in FIG. 7, the authentication information includes a user name to be used as identification information for identifying users (user ID), a password, an SIP address, a VLAN ID (VID), and an authentication algorithm. Required minimum information is a user name and a password. For example, when managing VIDs to users within the proxy server 600, VIDs are not needed. When an authentication algorithm is shared among users, the authentication algorithm does not need to be included in authentication information. The authentication information can include arbitrary information other than the authentication algorithm that is set entry by entry of users.

The figure depicts an example of authentication information about a user, which includes the user name "alice", the password "pass", the available SIP address (AoR) "alice@example.com", the providable VID "16", and the authentication algorithm to be applied "MD5". The authentication information means that the user with the user name "alice" can have access to the PC network 520 of the VID 16 shown in FIG. 1.

Returning to FIG. 6, the transmitting-receiving unit 701 transmits and receives various messages to be used for user authentication between the authentication server 700 and an external device, such as the proxy server 600 according to the AAA protocol. According to the embodiment, an example where the RADIUS protocol is applied as an AAA protocol is explained below.

For example, the transmitting-receiving unit 701 receives from the proxy server 600 an Access-Request message according to the RADIUS protocol that requests authentication of a user. Moreover, the transmitting-receiving unit 701 transmits to the proxy server 600 a RADIUS message that includes a code indicating an authentication result and a VID allocated to the user, as a final response message to the authentication request.

The authentication processing unit 702 exchanges messages between the authentication server 700 and an external device, such as the proxy server 600, according to the RADIUS protocol, and executes user authentication processing.

Login processing performed by the IP phone terminal 100 configured as described above according to the embodiment is explained below with reference to FIGS. 8 and 9.

The login processing is started when a user performs a login operation with the IP phone terminal 100. During the login processing, Hypertext Transfer Protocol (HTTP) digest authentication for registration of SIP address is executed between the IP phone terminal 100 and the proxy server 600, and messages according to the RADIUS protocol are exchanged between the proxy server 600 and the authentication server 700, so that the authentication protocol is operated.

As a result of the login authentication corresponding, address registration for the user to use the SIP address of the user on the IP phone terminal 100 is completed on the proxy server 600, at the same time, access permission and VLAN setting for the user to use the PC 300 connected via the IP phone terminal 100 are completed on the IP phone terminal 100.

To begin with, a user connects the PC 300 to the PC I/F unit 102 of the IP phone terminal 100 placed on a desk space (a desk 150). At the moment, any user has not logged in to the IP phone terminal 100 yet, therefore, only ordinary telephone functions are available. The PC 300 is accommodated to the guest network 540 at the moment (Step S801 and Step S802).

As described above, according to the embodiment, it is assumed that the user uses the both of the IP phone terminal 100 and the PC 300 placed on the desk space. In other words, it is assumed that the user of the IP phone terminal 100 and the user of the PC 300 placed on the desk space are the same.

The user then performs a login operation to the IP phone terminal 100. Specifically, the user specifies a user name and a password for example, on a display screen displayed on the display unit 126b of the IP phone terminal 100. The input unit 126a receives input of the user name and the password input by the login operation in this way (Step S803).

In the following explanations, suppose the user has input "alice" as the user name, and "pass" as the password, and the domain is preliminarily set to "example.com" in the IP phone terminal 100. Accordingly, an effective SIP address (AoR) of the user in the IP phone system includes "alice" as the user name in the user part, and "example.com" as the domain name in the domain part, so that the SIP address is "alice@example.com".

In this way, according to the embodiment, it is assumed that the user name agrees with the user part. If a user name is different from the user part of an SIP address, for example; the user I/F unit 126 can be configured to receive input of the user name and input of an SIP address (AoR) separately.

Alternatively, the IP phone terminal 100 can be configured to control the user I/F unit 126 so as to suggest a login operation to the user. For example, it can be configured such that the detecting unit 102*a* detects that the PC 300 is connected to the PC I/F unit 102, and notifies the application unit 125 of a detection result, and then the application unit 125 suggests a login operation to the user by providing screen display or an audio assist to the user I/F unit 126.

The application unit 125 holds the user name and the password input by the user, the SIP address corresponding to the user name or the SIP address input by the user. The application unit 125 requests the message processing unit 123 to register the SIP address corresponding to the user. The generating unit 123*a* of the message processing unit 123 generates an SIP Register Request message for registering the SIP address according to the SIP (Step S804).

FIG. 10 is an example of an SIP Register Request message generated at the step. As shown in FIG. 10, a header of the message is composed all according to the SIP standards. It is assumed that "register.example.com" as an address of the proxy server 600 to be specified as a destination is set in the IP phone terminal 100 prior to the start of the login authentication processing, and become available for the generating unit 123*a* to refer to.

The AoR of the user, "alice@example.com" is specified as the SIP address included in a From header and a To header. A contact address generated by the IP phone terminal 100 from the user name and an IP address assigned to the IP phone terminal 100 is specified as the SIP address included in a Contact header.

Returning to FIG. 8, the transmitting-receiving unit 123*b* of the message processing unit 123 transmits the generated SIP message to the proxy server 600 (Step S805). The SIP message transmitted in accordance with an instruction by the transmitting-receiving unit 123*b* reaches the switch unit 110 via the TCP/IP PROTOCOL STACK unit 122 and the IP-phone I/F unit 121. The switch unit 110 transfers outside a frame of the message as a frame of the IP-phone network 510 from the infrastructure I/F unit 101 in accordance with information about the VLAN set for the IP-phone I/F unit 121.

The proxy server 600 receives the transmitted SIP message with the network I/F unit 601. The SIP message reaches the message processing unit 603 via the TCP/IP PROTOCOL STACK unit 602. When the message processing unit 603 identifies the received SIP message as an SIP Register Request message, the message processing unit 603 requests the authentication processing unit 604 to start authentication processing to perform authentication required for SIP address registration.

When identifying the SIP message, the message processing unit 603 identifies the user name of the authentication subject as "alice", the SIP address (AoR) of the authentication subject as "alicep@example.com", and the SIP method of the authentication subject as "Register", based on the received SIP message, and notifies the authentication processing unit 604 about them.

The authentication processing unit 604 starts a communication by using the RADIUS protocol as an AAA protocol between the proxy server 600 and the authentication server 700 for SIP address registration. In other words, the authentication processing unit 604 starts operation as a RADIUS client. Specifically, the authentication processing unit 604 generates an Access-Request message according to the RADIUS protocol standards (Step S806).

FIG. 11 is an example of an Access-Request message of the RADIUS generated at the step. As shown in FIG. 11, the Access-Request message is composed all according to the standards of the RADIUS.

The message includes five attributes, namely, "NAS-IP-Address", "User-Name", "Digest-Method", "SIP-AOR", and "Message-Authenticator". The authentication processing unit 604 stores therein "192.168.0.100", which is an IP address of the proxy server 600 itself, as a value of the "NAS-IP-Address" attribute. The authentication processing unit 604 determines the value of the attribute by referring to the IP address preliminarily set for the proxy server 600.

Moreover, the authentication processing unit 604 stores therein information notified from the message processing unit 603 as a value of each of the attributes, "User-Name", "Digest-Method", and "SIP-AOR". Furthermore, the authentication processing unit 604 calculates a hash value from data combined from constituent elements of the message by using confidential information shared between the authentication server 700 and the proxy server 600 as a key according to the standards of the RADIUS, and stores therein the calculated hash value as a value of the "Message-Authenticator" attribute.

Returning to FIG. 8, the authentication processing unit 604 transmits the generated Access-Request message to the authentication server 700 via the TCP/IP PROTOCOL STACK unit 602 and the network I/F unit 601 (Step S807).

The transmitting-receiving unit 701 of the authentication server 700 receives the transmitted Access-Request message. The authentication processing unit 702 determines, from the attributes included in the received Access-Request message, that the proxy server 600 with the IP address "192.168.0.100" requests authentication to the user with the user name "alice" for the use of the AoR "alice@example.com" for the SIP method "Register".

The authentication processing unit 702 refers to the storage unit 710, and determines to perform digest authentication on the user with the user name "alice" by using the Message Digest Algorithm 5 (MD5). Moreover, the authentication processing unit 702 generates a Nonce to be used as a challenge value of the digest authentication. The authentication processing unit 702 then generates an Access-Challenge message to start the digest authentication (Step S808).

FIG. 12 is an example of an Access-Challenge message generated at the step. As shown in FIG. 12, the Access-Challenge message is composed all according to the standards of the RADIUS.

The message includes four attributes, namely, "Digest-Nonce", "Digest-Realm", "Digest-Algorithm", and "Message-Authenticator". The authentication processing unit 702 stores therein a character string "abcde" that is a Nonce to be used as a challenge of the digest authentication, as a value of the "Digest-Nonce" attribute. Moreover, the authentication processing unit 702 stores therein "example.com", which is a realm corresponding to the authentication to be executed, as a value of the "Digest-Realm" attribute. Furthermore, the authentication processing unit 702 stores therein "MD5", which indicates an authentication algorithm to be used, as a value of the "Digest-Algorithm" attribute. Furthermore, the authentication processing unit 702 calculates a hash value from data combined from constituent elements of the message by using confidential information shared between the authentication server 700 and the proxy server 600 as a key according to the standards of the RADIUS, and stores therein the calculated hash value as a value of the "Message-Authenticator" attribute.

Returning to FIG. 8, the transmitting-receiving unit 701 returns the generated Access-Challenge message to the proxy server 600 (Step S809).

The proxy server 600 receives the transmitted RADIUS message with the network I/F unit 601. The received message reaches the authentication processing unit 604 via the TCP/IP PROTOCOL STACK unit 602. The authentication processing unit 604 verifies that the received message is an Access-Challenge message corresponding to the Access-Request message transmitted at Step S807. Furthermore, the authentication processing unit 604 determines that a Nonce to be used as a challenge of the digest authentication is "abcde", a realm corresponding to the authentication to be executed is "example.com", and an authentication algorithm to be used is "MD5", and notifies the message processing unit 603 of a determination result.

The generating unit 603a of the message processing unit 603 that receives the notice generates a 401 Unauthorized Response message, which is an SIP message for executing digest authentication (Step S810).

FIG. 13 is an example of a 401 Unauthorized Response message generated at the step. As shown in FIG. 13, the header of the message is composed all according to the SIP standards, as a 401 Unauthorized Response in response to the SIP Register Request message transmitted from the IP phone terminal 100 at Step S805. The generating unit 603a composes a value of a "WWW-Authenticate" header by including information about the realm, the Nonce, and the algorithm notified from the authentication processing unit 604.

Returning to FIG. 8, the transmitting-receiving unit 603b of the message processing unit 603 transmits the generated SIP message to the IP phone terminal 100 via the TCP/IP PROTOCOL STACK unit 602 and the network I/F unit 601 (Step S811).

The infrastructure I/F unit 101 of the IP phone terminal 100 receives the transmitted SIP message. The message is received by the transmitting-receiving unit 123b of the message processing unit 123 further via the switch unit 110, the IP-phone I/F unit 121, and the TCP/IP PROTOCOL STACK unit 122.

When the message processing unit 123 identifies the received SIP message as a 401 Unauthorized Response message, the message processing unit 123 generates an SIP Register Request message according to the SIP standards to respond by generating a response corresponding to the challenge of the digest authentication included in the 401 Unauthorized Response message (Step S812). Specifically, the message processing unit 123 executes the following processing (A) to (C).

(A) The message processing unit 123 identifies information about digest authentication from the "WWW-Authenticate" header included in the received 401 Unauthorized Response message. For example, in a case of a message shown in FIG. 13, the message processing unit 123 identifies a Nonce to be used as a challenge of the digest authentication as "abcde", a realm corresponding to the authentication to be executed as "example.com", and an authentication algorithm to be used as "MD5".

(B) The message processing unit 123 generates an "Authorization" header to be added to an SIP Register Request message that is an SIP message into which response information about the digest authentication is to be included. Specifically, the message processing unit 123 generates an "Authorization" header that includes information in the following items (1) to (5).

(1) User name "alice" to be a subject of digest authentication
(2) Nonce character string "abcde" to be used as a challenge of digest authentication
(3) Realm "example.com" corresponding to the digest authentication to be executed
(4) SIP address "register.example.com" of the proxy server 600 to be set as a Request URI
(5) Response value ("fghij" in this case) corresponding to a challenge of digest authentication obtained by using the MD5 algorithm using the password "pass" input by the user as a key with respect to the above values (1) to (4)

The SIP address of the proxy server 600 in the above (4), is determined by referring to a predetermined value. The user name of the above (1) is determined from the user name that is input at Step S803, and stored in the application unit 125. Each piece of information about the above (2) and (3) is determined from the value of the "WWW-Authenticate" header included in the received 401 Unauthorized Response message. The hash value of the above (5) is calculated by the message processing unit 123.

It can be configured such that instead of receiving input of a password at Step S803, the realm corresponding to the digest authentication to be executed ("example.com") is acquired from the 401 Unauthorized Response message and presented to the user, and input of a password is required to the user at this stage. Accordingly, even if there is a plurality of AoRs of the user, the digest authentication can be executed by receiving input of an appropriate password corresponding to each of the AoR.

(C) The generating unit 123a of the message processing unit 123 generates an SIP Register Request message that is an SIP message into which response information about the digest authentication is to be included. This is equivalent to addition of the "WWW-Authenticate" header generated in the processing (B) to the SIP Register Request message transmitted at Step S805.

FIG. 14 is an example of an SIP Register Request message generated in the processing (C). As shown in FIG. 14, a header of the message is composed all according to the SIP standards. The message corresponds to a message for re-transmitting the SIP Register Request message transmitted at Step S805, however, the following points are different.
(1) The sequence number of a CSeq tag is increased by one
(2) A value of the tag of the From header is newly generated
(3) The "Authorization" header generated in the processing (B) is newly added Returning to FIG. 8, the transmitting-receiving unit 123b of the message processing unit 123 transmits the generated SIP message to the proxy server 600 via the TCP/IP PROTOCOL STACK unit 122, the IP-phone I/F unit 121, the switch unit 110, and the infrastructure I/F unit 101 (Step S813).

The proxy server 600 receives the transmitted SIP message with the network I/F unit 601. The SIP message reaches the message processing unit 603 via the TCP/IP PROTOCOL STACK unit 602. When the message processing unit 603 identifies the received SIP message as an SIP Register Request message, the message processing unit 603 requests the authentication processing unit 604 to start authentication processing for performing authentication required for SIP address registration.

When identifying, based on the received SIP address, the message processing unit 603 identifies the user name of the authentication subject as "alice", the SIP address (AoR) of the authentication subject as "alicep@example.com", the SIP method of the authentication subject as "Register", a Nonce corresponding to a challenge of the digest authentication as "abcde", a realm of the digest authentication as "example.com", an authentication algorithm of the digest authentication as "MD5", the SIP address (AoR) subjected to the digest authentication as "alice@example.com", and a value corresponding to a response to the digest authentication as "fghij", and notifies the authentication processing unit 604 about them.

The authentication processing unit 604 starts communication using the RADIUS protocol between the proxy server 600 and the authentication server 700 for SIP address registration. Specifically, the authentication processing unit 604 generates an Access-Request message according to the RADIUS protocol standards (Step S814).

FIG. 15 is an example of an Access-Request message generated at the step. As shown in FIG. 15, the Access-Request message is composed all according to the standards of the RADIUS.

The Access-Request message includes nine attributes, namely, "NAS-IP-Address", "User-Name", "Digest-Method", "Digest-Nonce", "Digest-Realm", "Digest-Algorithm", "SIP-AOR", "Digest-Response", and "Message-Authenticator".

Values of the four attributes, "NAS-IP-Address", "User-Name", "Digest-Method", and "SIP-AOR" are similar to those in the RADIUS message shown in FIG. 11 (Access-Request message) as described above. Values of the three attributes, "Digest-Nonce", "Digest-Realm", and "Digest-Algorithm" are similar to those in the RADIUS message shown in FIG. 12 (Access-Challenge message) as described above.

The authentication processing unit 604 stores therein the value "fghij" included in the "Authorization" header of the received SIP message as a value of the "Digest-Response" attribute. Moreover, the authentication processing unit 604 calculates a hash value from data combined from constituent elements of the message by using confidential information shared between the authentication server 700 and the proxy server 600 as a key according to the standards of the RADIUS, and stores therein the calculated hash value as a value of the "Message-Authenticator" attribute.

Returning to FIG. 8, the authentication processing unit 604 transmits the generated Access-Request message to the authentication server 700 via the TCP/IP PROTOCOL STACK unit 602 and the network I/F unit 601 (Step S815).

The transmitting-receiving unit 701 of the authentication server 700 receives the transmitted Access-Request message. The authentication processing unit 702 then executes digest authentication based on information obtained from the attributes included in the Access-Request message (Step S816).

Specifically, the authentication processing unit 702 acquires, at first, the password information "pass" of the user name "alice" corresponding to the "User-Name" attribute included in the received Access-Request message, from the storage unit 710. If a plurality of entries corresponding to the "User-Name" attribute is present in the storage unit 710, it can be configured to search the storage unit 710 for a corresponding entry additionally based on other attributes included in the received Access-Request message, such as the "SIP-AOR" attribute, and to acquire desired password information.

The authentication processing unit 702 then calculates a response value of MD5 digest authentication from the challenge value according to the procedure similar to the processing (B) ((1) to (5)) executed by the message processing unit 123 of the IP phone terminal 100 at Step S812. The authentication processing unit 702 then compares the calculated response value with the response value "fghij" of the "Digest-Response" attribute included in the received Access-Request message. If the calculated response value agrees with the received response value, the authentication processing unit 702 determines that the authentication is successfully completed.

According to the embodiment, the authentication processing unit 702 further acquires a VID corresponding to the authenticated user name "alice" from the storage unit 710 (Step S817). For example, when authentication information as shown in FIG. 7 is stored in the storage unit 710, the authentication processing unit 702 acquires the VID "16" corresponding to the user name "alice".

It can be configured such that the authentication processing unit 702 further acquires a tunnel type and a tunnel medium type corresponding to the authenticated the user name "alice" from the storage unit 710. The acquired tunnel type and the acquired tunnel medium type can be used as values to be set in an Access-Accept message, which will be described later. It can be configured such that a tunnel type and a tunnel medium type are not stored user by user in the storage unit 710, but values shared with users are preliminarily set to be used by the user. For example, it can be configured such that a tunnel type "VLAN" and a tunnel medium type "802" are set for all users. An example is explained below in a case where a tunnel type "VLAN" and a tunnel medium type "802" are set for all users.

After receiving the VID corresponding to the user, the authentication processing unit 702 generates an Access-Accept message that includes the acquired VID (Step S818).

FIG. 16 is an example of an Access-Accept message generated at the step. As shown in FIG. 16, the Access-Accept message is composed all according to the standards of the RADIUS. The message includes four attributes, namely, "Tunnel-Type", "Tunnel-Medium-Type", "Tunnel-Private-Group-ID", and "Message-Authenticator".

The authentication processing unit 702 stores therein "VLAN" as a value of the "Tunnel-Type" attribute, and "802" as a value of "Tunnel-Medium-Type" attribute. Moreover, the authentication processing unit 702 stores therein "16", which is the VID corresponding to the authenticated user name "alice", as a value of the "Tunnel-Private-Group-ID" attribute. Furthermore, the authentication processing unit 702 calculates a hash value from data combined from constituent elements of the message by using confidential information shared between the authentication server 700 and the proxy server 600 as a key according to the standards of the RADIUS, and stores therein the calculated hash value as a value of the "Message-Authenticator" attribute.

The three attributes, "Tunnel-Type", "Tunnel-Medium-Type", and "Tunnel-Private-Group-ID", are compliant with the RADIUS standards, however, conventionally, an Access-Accept message corresponding to a result of digest authentication generally does not include the three attributes.

Returning to FIG. 9, the transmitting-receiving unit 701 returns the generated Access-Accept message to the proxy server 600 (Step S819).

If the calculated response value does not agree with the received response value in the authentication processing at Step S816, the authentication processing unit 702 determines the authentication is failed. In such case, the authentication processing unit 702 generates an Access-Reject message, and returns it to the proxy server 600.

The proxy server 600 receives the RADIUS message transmitted at Step S819 with the network I/F unit 601. The RADIUS message reaches the authentication processing unit 604 via the TCP/IP PROTOCOL STACK unit 602.

The authentication processing unit 604 verifies that the received RADIUS message is a response message corresponding to the Access-Request message transmitted at Step S814. Furthermore, the authentication processing unit 604 determines whether the SIP address is authenticated based on a type of the RADIUS message, and notifies the message processing unit 603 of a determination result.

If the SIP address is authenticated, i.e., the received message is an Access-Accept message, the ID providing unit 605 specifies a VID corresponding to the user from the received message. Specifically, the ID providing unit 605 specifies the value of a VID corresponding to the user from the value of the "Tunnel-Private-Group-ID" attribute included in the Access-Accept message. The ID providing unit 605 then notifies the message processing unit 603 of the specified VID.

The generating unit 603a of the message processing unit 603 generates a responses message corresponding to the SIP Register Request message transmitted from the IP phone terminal 100 at Step S813 (Step S820).

Figures 17, 18:
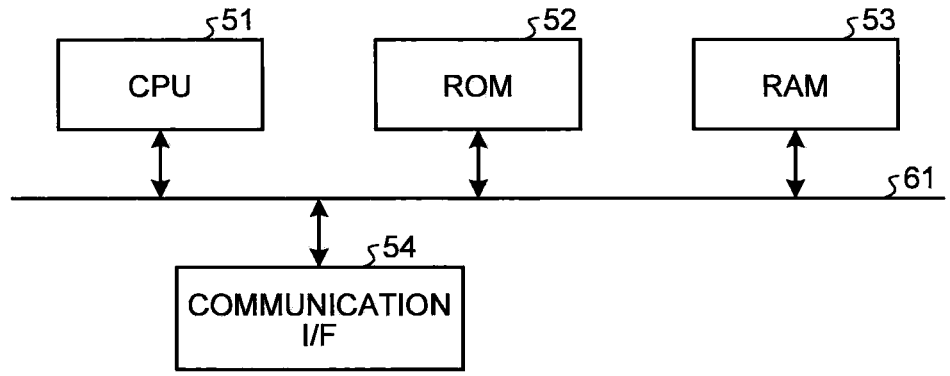
FIG. 17 is an example of a 200 OK Response message.
FIG. 18 is a schematic diagram of a hardware configuration of the IP phone terminal according to the embodiment.

A response message when the SIP address is authenticated is explained below first. In such case, the generating unit 603a generates a 200 OK Response message. FIG. 17 is an example of a 200 OK Response message generated in the case.

As shown in FIG. 17, a header of the 200 OK Response message is composed, all according to the SIP standards, as a response to the SIP Register Request message transmitted at Step S813. However, according to the embodiment, it is different from the SIP standards in a point that "vid" is provided as a parameter of a Contact header. The "vid" parameter means the VID of a network that is to accommodate the PC 300 connected by the user whose SIP address registration is permitted.

A message when the SIP address is not authenticated is then explained below. In such case, according to the SIP standards, a 401 Unauthorized Response message is generated as a response to the SIP Register Request message transmitted at Step S813.

Returning to FIG. 9, the transmitting-receiving unit 603b of the message processing unit 603 transmits the generated SIP message to the IP phone terminal 100 via the TCP/IP PROTOCOL STACK unit 602 and the network I/F unit 601 (Step S821).

The infrastructure I/F unit 101 of the IP phone terminal 100 receives the transmitted SIP message. The message is received by the transmitting-receiving unit 123b of the message processing unit 123 further via the switch unit 110, the IP-phone I/F unit 121, and the TCP/IP PROTOCOL STACK unit 122.

When the message processing unit 123 identifies the received SIP message as a 200 OK Response message, the message processing unit 123 notifies the application unit 125 that the SIP address registration is authenticated and completed. Moreover, the message processing unit 123 identifies the authenticated VID by referring to the "vid" parameter included in the contact header of the 200 OK Response message (Step S822). The message processing unit 123 then notifies the control unit 127 of the VID.

The control unit 127 controls the switch unit 110 in accordance with a value of the VID notified from the message processing unit 123, and dynamically changes a VLAN to which the PC I/F unit 102 belongs (Step S823). For example, when receiving an SIP message as shown in FIG. 17, the control unit 127 changes the VLAN to be allocated to the PC I/F unit 102 from the guest network 540 (VID 19) to the PC network 520 (VID 16).

By contrast, if the message processing unit 123 identifies the received SIP message as an 401 Unauthorized Response message, the message processing unit 123 notifies the application unit 125 that the SIP address registration is failed. In such case, it can be configured such that the application unit 125 requests again a login operation to the user. If address registration is failed successively, it can be configured such that the application unit 125 rejects login operation for a certain time.

When the SIP address registration is failed, the message processing unit 123 does not notify the control unit 127 of value of the VID. Consequently, the control unit 127 does not control the switch unit 110, the VLAN to which the PC I/F unit 102 belongs remains the guest network 540.

Thus, the authentication processing for the SIP address registration of the user is terminated.

When the SIP address registration is completed, and the VID of the PC I/F unit 102 is changed, the PC 300 turns to be accommodated to the VLAN of the changed VID. For example, when the accommodated location is changed to the VLAN of the VID 16, the PC 300 become capable of being connected to the PC network 520 (Step S824 and Step S825).

After that, if the PC 300 is carried away, and the network connection of the PC I/F unit 102 to the IP phone terminal 100 is disconnected, it can be configured to terminate the authenticated allocation to the VLAN. Specifically, it can be configured such that when the detecting unit 102a detects disconnection of the connection to the PC 300, the IP phone terminal 100 executes a message exchange for SIP address registration termination with the proxy server 600, and the SIP address authentication and the allocation of the VID to the PC I/F unit 102 are terminated. In such case, the IP phone terminal 100 has no logged in user.

Moreover, it can be configured in the same case such that the message processing unit 123 notifies the control unit 127 of a termination of the SIP address authentication, and the VLAN corresponding to the PC I/F unit 102 is changed to the guest network 540 (VID 19). Consequently, the PC 300 that makes a connection to the PC I/F unit 102 is to be accommodated to the guest network 540.

If the authentication is failed, and the VID of the PC I/F unit 102 is not changed, the PC 300 remains in the state at Steps S801 and S802, that is, the PC 300 is to be accommodated to the guest network 540 (VID 19).

According to the above sequence, when the SIP address registration is completed, at the same time, the access permission and the VLAN setting for a user to use the PC 300 are completed.

The example explained above is in a case of performing processing of allocating a VLAN to the PC I/F unit 102 for the PC 300 simultaneously with authentication for SIP address registration. Instead of allocating a VLAN, acceptability of an access to the network can be set on the PC I/F unit 102.

In this way, the IP phone terminal according to the embodiment can perform setting of a VLAN that the IP phone terminal intermediately connects to a PC together with registration of SIP address of the IP phone terminal when login authentication of the IP phone terminal is successfully completed. Accordingly, the PC does not need to executed network access authentication, so that operations for using the PC connected to the network via the IP phone terminal can be simplified.

A hardware configuration of the IP phone terminal according to the embodiment is explained below with reference to FIG. 18.

The IP phone terminal according to the embodiment includes a control device such as a central processing unit (CPU) 51, a storage device such as a read-only memory (ROM) 52 and a RAM 53, a communication I/F 54 configured to be connected to a network for performing communication, and a bus 61 that connects between each unit.

A computer program to be executed on the IP phone terminal according to the embodiment is provided by being incorporated in, for example, the ROM 52, in advance.

The computer program to be executed on the IP phone terminal according to the embodiment can be provided in a file in an installable format or in an executable format recorded onto a computer-readable recording medium, such as a compact disk read only memory (CD-ROM), a flexible disk (FD), a compact disk recordable (CD-R), or a digital versatile disk (DVD).

The computer program to be executed on the IP phone terminal according to the embodiment can be configured to be provided from a computer that stores therein the computer program connected to a network, such as the Internet, by being downloaded via the network. Alternatively, the computer program can be provided or distributed via a network such as the internet.

The computer program to be executed on the IP phone terminal according to the embodiment has a module configuration that includes the units described above (namely, the TCP/IP PROTOCOL STACK unit, the message processing unit, the media processing unit, the application unit, and the control unit). As the CPU 51 reads the computer program from the ROM 52 and executes the program, each of the units is loaded on the main memory, and each of the units is generated on the main memory as practical hardware.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An Internet-protocol phone terminal that mediates a connection between a computer terminal and a network comprising:
    an Internet-protocol phone processing unit that provides an Internet-protocol phone function by registering address information, which is information for identifying a user, for specifying the user as a communication destination to a server that is connected to the Internet-protocol phone terminal via the network;
    a first interface that connects to the network;
    a second interface that connects to the computer terminal; and
    a transfer unit that
        transfers a message between the network connected through the first interface and the computer terminal connected through the second interface,
        transfers a message between the network connected through the first interface and the Internet-protocol phone processing unit, and
        transfers a message between the computer terminal connected through the second interface and the Internet-protocol phone processing unit, wherein
    the Internet-protocol phone processing unit includes:
        an input unit that inputs a user identification not from the computer terminal, which is information for identifying the user, to be used for an authentication of the user;
        a generating unit that generates a registration message requesting a registration of the address information of the user identified by the user identification input by the input unit;
        a transmitting unit that transmits the registration message to the server;
        a receiving unit that receives a response message including registration information indicating availability of the registration of the address information and connection information indicating availability of a connection of the computer terminal to the network from the server, the response message indicative of a permission for connection of the computer terminal to the network, and the connection being a connection for transmitting a message other than a message that is transmitted by the Internet-protocol phone function; and
        a control unit that
            controls the transfer unit not to transfer a first message between the network connected through the first interface and the computer terminal connected through the second interface before the receiving unit receives the response message, the first message being a message other than the message that is transmitted by the Internet-protocol hone function, and
            controls the transfer unit to transfer the first message between the network connected through the first interface and the computer terminal connected through the second interface after the receiving unit receives the response message; and
        the Internet-protocol phone processing unit provides, when the registration of the address information is permitted, the Internet-protocol phone function, which is specific to the user that is identified by the address information.

2. The Internet-protocol phone terminal according to claim 1, wherein
    the connection information includes a network identification for identifying a network to which the connection is permitted, and
    the control unit that controls the transfer unit to transfer the message between the computer terminal and the network identified by the network identification.

3. The Internet-protocol phone terminal according to claim 1, wherein the generating unit generates the address information including the user identification, and generates the registration message including the address information with the user identification included.

4. The Internet-protocol phone terminal according to claim 1, wherein
    the input unit further inputs the address information of the user, and
    the generating unit generates the registration information including the address information input by the input unit.

5. The Internet-protocol phone terminal according to claim 1, further comprising:
    a detecting unit that detects connection of the computer terminal to the network; and a display unit that displays a screen for specifying the user identification when the connection of the computer terminal is detected, wherein
the input unit inputs the user identification specified on the display screen.

6. The Internet-protocol phone terminal according to claim 1, further comprising a detecting unit that detects a disconnection of the computer terminal from the network, wherein
when the disconnection of the computer terminal is detected, the control unit controls the transfer unit not to transfer message between the network and the external computer terminal.

7. A communication system comprising:
an Internet-protocol phone terminal that mediates a connection between a computer terminal and a network; and
a server that is connected to the Internet-protocol phone terminal via the network, to which address information, which is information for identifying a user, for specifying the user as a communication destination is registered, wherein
the Internet-protocol phone terminal includes:
an Internet-protocol phone processing unit that provides an Internet-protocol phone function by registering the address information,
a first interface that connects to the network,
a second interface that connects to the computer terminal,
a transfer unit that
transfers a message between the network connected through the first interface and the computer terminal connected through the second interface,
transfers a message between the network connected through the first interface and the Internet-protocol phone processing unit, and
transfers a mess ase between the computer terminal connected through the second interface and the Internet-protocol phone processing unit,
the Internet-protocol phone processing unit includes:
an input unit that inputs a user identification not from the computer terminal, which is information for identifying the user, to be used for an authentication of the user,
a generating unit that generates a registration message requesting a registration of the address information of the user identified by the user identification input by the input unit,
a transmitting unit that transmits the registration message to the server,
a receiving unit that receives a response message including registration information indicating availability of the registration of the address information and connection information indicating availability of a connection of the computer terminal to the network from the server, the response message indicative of a permission for connection of the computer terminal to the network, and the connection being a connection for transmitting a message other than a message that is transmitted by an Internet-protocol phone function, and
a control unit that
controls, the transfer unit not to transfer a first message between the network connected through the first interface and the computer terminal connected through the second interface before the receiving unit receives the response message, the first message being a message other than the message that is transmitted by the Internet-protocol phone function, and
controls the transfer unit to transfer the first message between the network connected through the first interface and the computer terminal connected through the second interface after the receiving unit receives the response message;
the Internet-protocol phone processing unit provides, when the registration of the address information is permitted, the Internet-protocol phone function, which is specific to the user that is identified by the address information, and
the server includes:
a receiving unit that receives the registration message from the Internet-protocol phone terminal,
an authentication processing unit that performs an authentication of the address information,
a generating unit that generates the response message including the registration information and the connection information, and
a transmitting unit that transmits the response message to the Internet-protocol phone terminal.

8. A communication method for a communication system including an Internet-protocol phone terminal that mediates a connection between a computer terminal and a network and a server that is connected to the Internet-protocol phone terminal via the network, wherein
the Internet-protocol phone terminal comprises:
an Internet-protocol phone processing unit that provides an Internet-protocol phone function by registering address information, which is information for identifying a user, for specifying the user as a communication destination to the server;
a first interface that connects to the network;
a second interface that connects to the computer terminal; and
a transfer unit that
transfers a message between the network connected through the first interface and the computer terminal connected through the second interface,
transfers a message between the network connected through the first interface and the Internet-protocol phone processing unit, and
transfers a message between the computer terminal connected through the second interface and the Internet-protocol phone processing unit,
the communication method comprising:
first generating including the Internet-protocol phone terminal generating a registration message requesting a registration of the address information of a user identified by a user identification based on an input not from the computer terminal;
first transmitting including the Internet-protocol phone terminal transmitting the registration message to the server;
first receiving including the server receiving the registration message from the Internet-protocol phone terminal;
authenticating including the server authenticating the address information;
second generating including the server generating a response message including registration information indicating availability of the registration of the address information and connection information indicating availability of a connection of the computer terminal to the network from the server, the response message indicative of a permission for connection of the computer terminal to the network, and the connection being a connection for transmitting a message other than a message that is transmitted by an Internet-protocol phone function;

second transmitting including the server transmitting the response message to the Internet-protocol phone terminal;

second receiving including the Internet-protocol phone terminal receiving the response message from the server;

controlling including the Internet-protocol phone terminal controlling the transfer unit not to transfer a first message between the network connected through the first interface and the computer terminal connected through the second interface before the receiving unit receives the response message, the first message being a message other than the message that is transmitted by the Internet-protocol phone function, and controlling the transfer unit to transfer the first message between the network connected through the first interface and the computer terminal connected through the second interface after the receiving unit receives the response message; and providing, by the Internet-protocol phone processing unit, when the registration of the address information is permitted, the Internet-protocol phone function, which is specific to the user that is identified by the address information.

9. A non-transitory computer-readable recording medium that stores therein a computer program for controlling a transfer of a message in a computer, wherein the computer mediates a connection between a computer terminal and a network, and the computer comprises:
  an Internet-protocol processing unit that provides an Internet-protocol phone function by registering address information, which is information for identifying a user, for specifying the user as a communication destination to a server that is connected to the computer via the network;
  a first interface that connects to the network;
  a second interface that connects to the computer terminal; and
  a transfer unit that
    transfers a message between the network connected through the first interface and the computer terminal connected through the second interface,
    transfers a message between the network connected through the first interface and the Internet-protocol processing unit, and
    transfers a message between the computer terminal connected through the second interface and the Internet-protocol processing unit;

the computer program when executed causes the computer to execute:
  generating a registration message requesting a registration of the address information of a user identified by a user identification based on an input not from the computer terminal;
  transmitting the registration message to the server;
  receiving a response message including registration information indicating availability of the registration of the address information and connection information indicating availability of a connection of the computer terminal to the network from the server, the response message indicative of a permission for connection of the computer terminal to the network, and the connection being a connection for transmitting a message other than a message that is transmitted by an Internet-protocol phone function; and
  controlling the transfer unit not to transfer a first message between the network connected through the first interface and the computer terminal connected through the second interface before the receiving unit receives the response message, the first message being a message other than the message that is transmitted by the Internet-protocol phone function, and controlling the transfer unit to transfer the first message between the network connected through the first interface and the computer terminal connected through the second interface after the receiving unit receives the response message; and the computer program when executed causes the Internet-protocol processing unit to provide, when the registration of the address information is permitted, the Internet-protocol phone function, which is specific to the user that is identified by the address information.

* * * * *

UNITED STATES PATENT AND TRADEMARK OFFICE
CERTIFICATE OF CORRECTION

| | | |
|---|---|---|
| PATENT NO. | : 9,065,684 B2 | Page 1 of 1 |
| APPLICATION NO. | : 12/365242 | |
| DATED | : June 23, 2015 | |
| INVENTOR(S) | : Tanizawa et al. | |

It is certified that error appears in the above-identified patent and that said Letters Patent is hereby corrected as shown below:

In the claims,

Claim 7, column 23, line 37, change "transfers a mess ase" to --transfers a message--.

Signed and Sealed this
Twelfth Day of January, 2016

Michelle K. Lee
*Director of the United States Patent and Trademark Office*